United States Patent
Yang et al.

(10) Patent No.: US 7,033,059 B2
(45) Date of Patent: Apr. 25, 2006

(54) LIGHT GUIDE APPARATUS FOR ENHANCING LIGHT SOURCE UTILIZATION EFFICIENCY

(75) Inventors: Jauh-Jung Yang, Hsinchu (TW); Jian-Shian Lin, Hsinchu (TW); Po-Hung Yao, Hsinchu (TW); Jyh-Chun Chang, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 44 days.

(21) Appl. No.: 10/810,666

(22) Filed: Mar. 29, 2004

(65) Prior Publication Data

US 2005/0129357 A1 Jun. 16, 2005

(30) Foreign Application Priority Data

Dec. 12, 2003 (TW) .............................. 92135125 A

(51) Int. Cl.
*B29D 11/00* (2006.01)
*F21V 5/00* (2006.01)
*G02B 6/00* (2006.01)

(52) U.S. Cl. ...................... 362/582; 362/559; 362/560; 362/561; 362/260; 362/330

(58) Field of Classification Search ................ 362/582, 362/558, 559, 560, 561, 260, 330, 511
See application file for complete search history.

(56) References Cited

U.S. PATENT DOCUMENTS

| | | | | |
|---|---|---|---|---|
| 3,641,332 A | * | 2/1972 | Reick et al. ................. | 362/582 |
| 5,253,151 A | | 10/1993 | Mepham | |
| 6,336,728 B1 | * | 1/2002 | Deloy ......................... | 362/614 |
| 6,347,873 B1 | * | 2/2002 | Hosseini et al. ............ | 362/624 |
| 6,407,781 B1 | | 6/2002 | Kitada | |
| 6,435,686 B1 | * | 8/2002 | Gotou et al. ................. | 362/623 |
| 2004/0008524 A1 | * | 1/2004 | Lee et al. ..................... | 362/561 |

FOREIGN PATENT DOCUMENTS

KR 2003079019 A * 10/2003

* cited by examiner

*Primary Examiner*—Sandra O'Shea
*Assistant Examiner*—Sharon Payne
(74) *Attorney, Agent, or Firm*—Rabin & Berdo, P.C.

(57) ABSTRACT

A light guide apparatus for enhancing light source utilization efficiency includes a light guide sheet, a light coupling structure and a light emerging structure. The light coupling structure is arranged on a surface of the light guide sheet and opposite to a light source. The light emerging structure is disposed on a surface of light guide sheet. Lights emitted by the light source enters into the light guide sheet via the light coupling structure and evenly emitted to outer environment via said light emerging structure, thereby enhancing light source utilization efficiency.

10 Claims, 2 Drawing Sheets

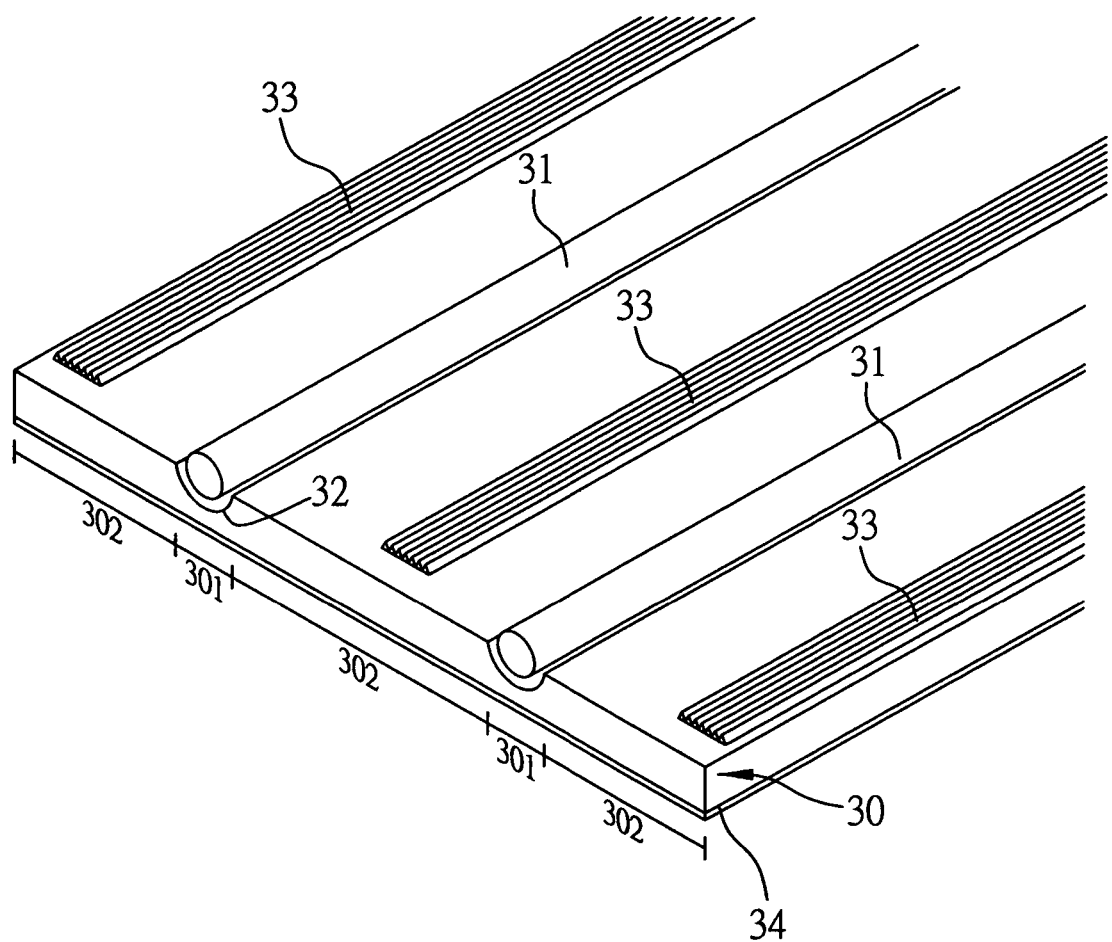
FIG. 3
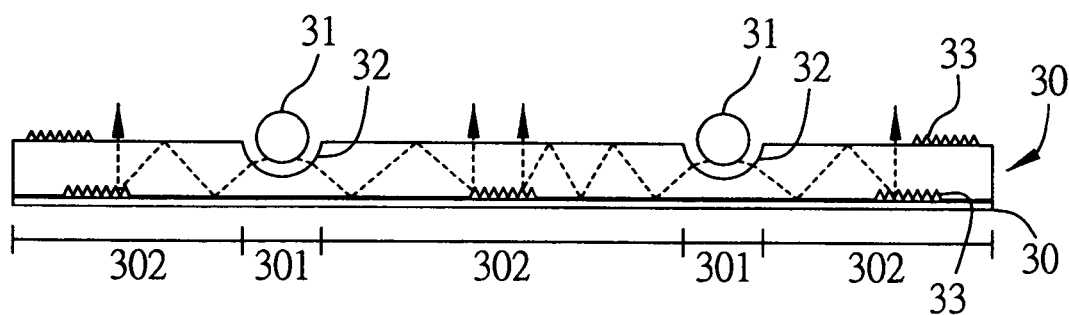
FIG. 4
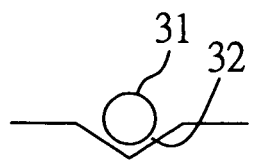 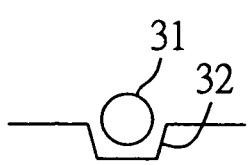 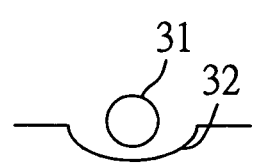
FIG. 5A  FIG. 5B  FIG. 5C

LIGHT GUIDE APPARATUS FOR ENHANCING LIGHT SOURCE UTILIZATION EFFICIENCY

BACKGROUND OF THE INVENTION

1. Field of the Invention

The present invention relates generally to light guide devices, and more particularly, to a light guide apparatus applied to a direct type backlight module.

2. Description of the Related Art

Several years ago, large-scale liquid crystal display (LCD) is mostly applied to a laptop computer or an LCD monitor or the like. However the LCD does not emit light itself, thereby an external light source is needed for illumination and image displaying. The backlight module applied thereto is preferred to be light in weight, small in size and thin in thickness. In recent years, when the backlight module is applied to a large panel, such as LCD TV, it is required that the backlight module has properties like high display luminance, broad visual angle, distinct image contrast and long life. Therefore, direct type backlight module, which takes the place of lateral light source applied to prior arts for lightening the weight and thickness thereof, evenly scatters the lights, coverts the lights into area lights, and guides the lights into the LCD panel, thereby meeting the requirements mentioned above.

LCD monitor, thin film transistor (TFT) in particular, generally applies backlight module as light source. The lights of the backlight module are generated by cold cathode fluorescernt lamp (CCFL) or light emitting diode (LED). The CCFL has properties like high brightness, high efficiency, long life and high color rendering index, and additionally has a cylinder-shaped configuration which is easily coupled with light reflecting components to form laminal lighting device. Consequently, the CCFL is widely used in flat panel display (FPD).

In the direct type backlight module, the CCFLs are usually aligned in a row and disposed at a bottom of the LCD panel. Such arrangement creates the problem that the profiles of the CCFLs unevenly distribute luminance, and cast shadows on the screen of the LCD. That is, for meeting the demand of high luminance, conventional direct type backlight module applied great number of the CCFLs thereto, as a result, with the increasing of the number of the CCFLs, the deficiency of black and white strips of shadows shown on the screen of the LCD becomes more serious.

To solve the aforementioned problem, U.S. Pat. No. 5,253,151 provides a solution titled as "luminaire for use in backlighting a liquid display matrix". Referring to FIG. 1, the luminaire 10 comprises at least one light generating unit 11 and a reflector. The reflector 12 has a special shaped structure which can guide the lights of the light generating unit 11 to an LCD module, and reflect the lights of the light generating unit 11 rearwardly scattered, thereby making full use of the lights of the light generating unit 11.

However, this special shaped structure of the reflector 12 is so complicated that elaborate and time consuming calculation and design must be preprocessed. Thus problems like difficulty of manufacture, rising of costs and inconvenience of assembly are presents.

U.S. Pat. No. 6,407,781 discloses another LCD device titled "LCD device having electronic formed within concave portion of a reflector". Referring to FIG. 2, the LCD device 20 includes an LCD panel 21 and a resin frame member 22 having a reflecting plate 23. The resin frame member 22 is disposed at a backside of the LCD panel 21. The reflecting plate 23 comprises a wavy structure designed for reflecting the lights emitted by light sources 24.

However, the LCD device 20 merely serves as a light reflector, and can not thoroughly solve the problem of energy waste under the circumstance of the reflected lights enter into the light source again. Furthermore, the LCD device 20 can not perform a guiding function for the reflected lights, that is, can not adjust the distribution of the reflected lights to achieve greater light utilization efficiency.

Additionally, the problems, such as the luminance quality and the replacing of the CCFLs when the CCFLs fail in a direct type of backlight module, are still unsolved in the conventional devices. Accordingly, obvious low luminance area and uneven light distributing caused by the above problems, and severely affect the service life of the direct type backlight module products.

Moreover, conventional direct type backlight module is composed of a plurality of CCFLs and a reflecting plate for reflecting the lights emitted from the bottom of the CCFLs toward the LCD panel. However, the conventional reflecting plate does not have the function of adjusting the travel passages of the reflected lights, thereby part of the lights are reflected back into the CCFLs and wasted. Thus the light utilization efficiency of the CCFLs is decreased.

SUMMARY OF THE INVENTION

The primary objective of the present invention is to provide a light guide apparatus for enhancing light source utilization efficiency, which solves the problem of energy waste when the lights are reflected back into the light sources.

Another objective of the present invention is to provide a light guide apparatus for enhancing light source utilization efficiency, which efficiently guides the lights to a proper emerging area to enhance light source utilization efficiency.

A further objective of the present invention is to provide a light guide apparatus for enhancing light source utilization efficiency, which reduces the require quantity of light sources used in the apparatus for cutting down manufacture costs.

And yet another objective of the present invention is to provide a light guide apparatus for enhancing light source utilization efficiency, wherein lights of the light sources are evenly distributed and compensated as to eliminated the deficiency of low luminance areas caused by part of the light sources fail.

In accordance with the above and other objectives, the present invention proposes a light guide apparatus for enhancing light source utilization efficiency. The light guide apparatus includes a light guide sheet, a light coupling structure and a light emerging structure. The light coupling structure is arranged on a surface of the light guide sheet and opposite to a light source. The light emerging structure is disposed on a surface of light guide sheet. Lights emitted by the light source entered into the light guide sheet through the light coupling structure, and then evenly emitted to outer environment through said light emerging structure thereby enhancing light source utilization efficiency.

Additionally, the light guide apparatus made of a transparent light guide sheet having a top surface and a bottom surface possesses a refractive index greater than that of the outer environment (such as the air) where the light source locates. The light emerging structure defines a plurality of grooves extending along the light source (generally is lamp). The configuration, depth and specific structure of the groove can be adjusted according to the specific diameter and configuration of the light source. The lights emitted by the light source enter into the light guide apparatus through the grooves from the outer environment, and occur total reflection inside the light guide apparatus, thereby evenly distributing the light energy.

By defining the grooves in the light coupling structures, the light emitted by the light source enters into the light guide apparatus through the grooves from the outer environment. The lights inside the light guide apparatus keep transmitting inside the light guide apparatus because of total reflection effect and will not be reflected back into the light source thereby reducing light energy waste and enhancing the light source utilization efficiency. Furthermore, because the total reflection effect of the lights inside the light guide apparatus, the light energy of the light source is evenly distributed, and the micro structures formed on the light emerging structure changes the total reflection balance to guide the lights to predetermined area to emit to the outer environment. That is, by the guiding function of the light guide apparatus, the light energy of different light sources can be evenly distributed and compensated. Therefore, under the circumstance of part of the light sources fail, the light guide apparatus of the present invention having the function mentioned above can solve the problems of low luminance areas caused by the failure of the said lights and the unevenly luminance of the whole apparatus, thereby adjusting the light luminance distribution and enhancing the light source utilization efficiency which do not need to apply the complicated reflecting structures of the prior arts.

BRIEF DESCRIPTION OF THE DRAWINGS

The drawings included herein provide a further understanding of the invention. A brief description of the drawings is as follows:

FIG. 3 is an isometric view of a light guide apparatus for enhancing light source utilization efficiency in accordance with a preferred embodiment of the present invention;

FIG. 4 is a cross-sectional view of the light guide apparatus of FIG. 3; and

FIGS. 5A–5C are cross-sectional views of alternate embodiments of a groove of a light coupling structure of the light guide apparatus of FIG. 3.

DETAILED DESCRIPTION OF THE PREFERRED EMBODIMENT

Figure 1:
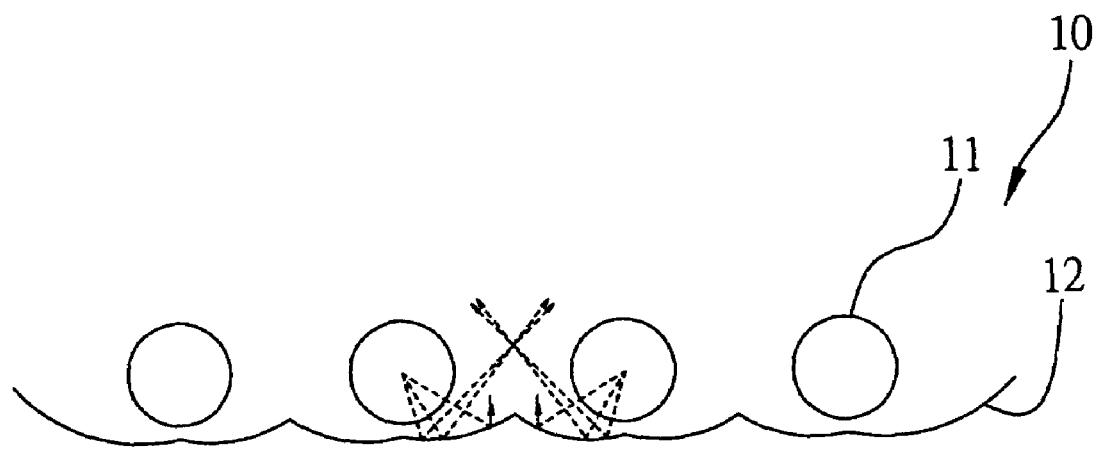
FIG. 1 (Prior Art) is a cross-sectional view of a conventional luminaire according to U.S. Pat. No. 5,253,151.
Figure 2:
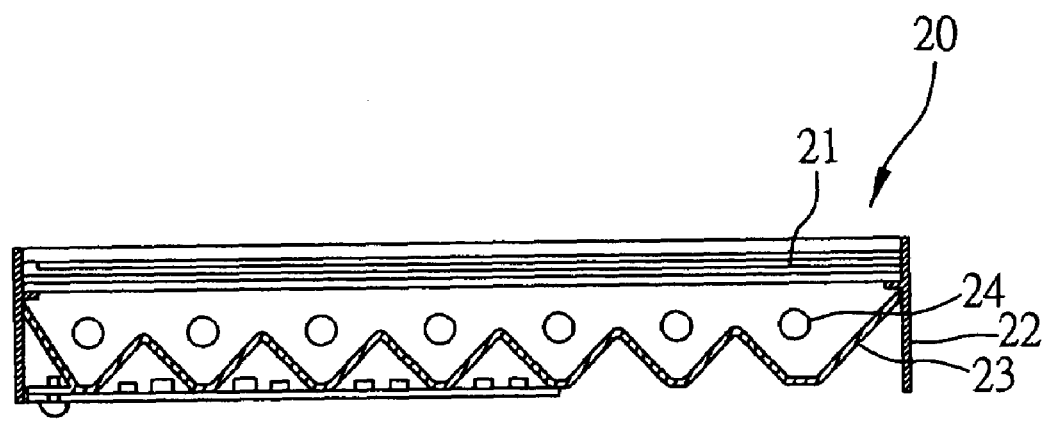
FIG. 2 (Prior Art) is a cross-sectional view of a conventional liquid crystal display (LCD) device according to U.S. Pat. No. 6,407,781.

Referring to FIG. 3 and FIG.4, a light guide apparatus 30 for enhancing light source utilization efficiency in accordance with a preferred embodiment of the present invention is illustrated. The light guide apparatus 30 can be applied to a direct type backlight module of a liquid crystal display (LCD) device (not shown), and be disposed under a plurality of light sources, for example a plurality of cold cathode fluorescernt lamps (CCFLs) 31 (this is referred to simply as "lamps").

The light guide apparatus 30 made of a transparent light guide sheet which is having a top surface and a bottom surface, and it possesses a refractive index greater than that of the outer environment (such as the air) where the lamps 31 locate. The light guide apparatus 30 comprises a plurality of light coupling structures 301 and light emerging structures 302. Material for making the light guide apparatus 30 can be transparent polymer material, such as polycarbonate (PC) which has a relative high refractive index, excellent heat resistance and impact resistance, and small hygroscopic capacity, or other materials like polyethylene terephthalate (PET) or poly methyl methacrylate (PMMA) which has a transparent body for reducing the light absorbance effect.

The light coupling structures 301 of the light guide apparatus 30 are arranged adjacent to the lamps 31, preferably right under the lamps 31. Each light coupling structure 301 defines an elongated groove 32 having a circular arc shape section corresponding to the lamps 31. The groove 32 extends along the lamps 31 for the lights of the lamps 31 entering into the light guide apparatus 30, wherein the depth and diameter of the groove 32 can be adjusted according to the diameter of the corresponding lamp 31, and the radius of curvature of the groove 32 can be equal or not equal to that of the corresponding lamp 31. As can be easily understood, the sectional view of the lamp 31 is not limited to be circular, correspondingly, the sectional view of the groove 32 is not limited to circular arc shape, referring to FIGS. 5A–5C, but also can be triangle, polygon or other curved surfaces, which can also achieve the effect of coupling the lights. However, it is preferred that the centre of the lamp 31 is disposed at the center of the groove 32, that is, when the lamp 31 is concentric with corresponding groove 32, the amount of the lights of the lamp 31 coupled into the light guide apparatus 30 is maximum.

Furthermore, the relative position and distance between the grooves 32 and the lamps 31 can be adjusted according to the amount of coupling light needed.

When the lights of the lamps 31 enter into the light coupling structure 301 of the light guide apparatus 30 fro outer environment, because the refractive index of the light guide apparatus 30 is greater than that of the outer environment, during the course of the lights inside the light guide apparatus 30 emitting to the outer environment, and the incidence angles of said lights increasing to a predetermined angle (critical angle), the refraction lights disappear, and all of the lights are reflected back into the light guide apparatus 30 (total reflection). Therefore, the lights inside to the light guide apparatus 30 keep transmitting inside the light guide apparatus 30 because of total reflection.

The light emerging structures 302 of the light guide apparatus 30 are disposed at the areas where the light coupling structures 301 do not locate. Micro structures 33 are formed on the light emerging structures 302, or micro particles are incorporated in the light emerging structures 302, for scattering the lights of total reflection with different angles thereby changing the total reflection balance and enabling the lights to emit to outer environment from the surface of the light guide apparatus 30. The micro structures 33 and the micro particles can be arranged on the top surface and bottom surface of the light guide apparatus by ultra-precision machining, or can be configured as a cooperative arrangement for achieving a best emerging position and direction for the lights. The configuration of the micro structure 33 can be a rhombic structure, a circular dot structure or an irregular structure.

Additionally, by cooperatively arranging the locating positions, density and configuration of the micro structures 33, the light intensity distributing can be efficiently controlled. The light guide apparatus further comprises a reflecting surface 34 at a bottom thereof. The reflecting surface 34 cooperates with the plurality of lamps 31 to form a high luminance device applied to a backlight module for different scale LCD panels.

The light guide apparatus 30: is featured in defining the grooves 32 extending along the lamps 31 and disposed adjacent to the lamps 31, wherein the configuration, depth and specific structure can be adjusted according to different designs of the lamps 31; importing the lights emitted by the lamps 31 to the light guide apparatus through the grooves 32, wherein the lights occurs total reflection inside the light guide apparatus 30 thereby evenly distributing the lights; and providing the micro structures 33 formed on the emerging surface for guiding the lights to predetermined position from which the lights emit to the outer environment thereby achieving the effect of evenly distributing the lights.

By defining the grooves 32 in the light coupling structures 301, the light emitted by the lamps 31 enters into the light guide apparatus 30 through the grooves 32 from the outer environment. The lights inside the light guide apparatus 30 keep transmitting inside the light guide apparatus 30 because of total reflection effect and will not be reflected back into the lamps 31 thereby reducing light energy waste and enhancing the light source (lamps 31) utilization efficiency. Additionally, because the total reflection effect of the lights inside the light guide apparatus 30, the light energy of the lamps 31 is evenly distributed, and the micro structures 33 formed on the light emerging structure 302 changes the total reflection balance to guide the lights to predetermined area to emit to the outer environment. That is, by the guiding function of the light guide apparatus 30, the light energy of different light sources can be evenly distributed and compensated. Therefore, under the circumstance of part of the light sources fail, the light guide apparatus 30 of the present invention having the function mentioned above can solve the problems of low luminance areas caused by the failure of the said lights and the unevenly luminance of the whole apparatus, thereby adjusting the light luminance distribution and enhancing the light source utilization efficiency which do not need to apply the complicated reflecting structures of the prior arts.

The above embodiments of the light guide apparatus 30 are described as being applied to a direct type backlight module, whereas light guide apparatus 30 can also be applied to other device whose lights emitted from the light sources need to be guided or distributed to other structures. Furthermore, the light sources of the present invention are not limited to the lamps 31, but can be any type of light source.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light guide apparatus for enhancing light source utilization efficiency, comprising:
    a light guide sheet;
    a light coupling structure arranged on a surface of the light guide sheet and opposite to a light source, wherein the light coupling structure is formed with at least one groove extending along the light source, and wherein the light coupling structure is disposed substantially under the light source, and a distance from a geometrical center of the groove to the center of the light source is adjustable according to an amount of coupling lights needed; and
    a light emerging structure disposed on the surface of the light guide sheet;
    wherein light emitted by the light source can be introduced into the light guide sheet by the light coupling structure and can be drawn out of the light guide sheet by the light emerging structure, thereby enhancing light source utilization efficiency.

2. The light guide apparatus as claimed in claim 1, wherein the light guide sheet is made of a material having a refractive index greater than that of an outer environment where the light source is located.

3. The light guide apparatus as claimed in claim 2, wherein the material of the light guide sheet is a material selected from the group consisting of polycarbonate (PC), polyethylene terephthalate (PET) and polymethylmethacrylate (PMMA).

4. The light guide apparatus as claimed in claim 1, wherein the lights emitted by the light source can be introduced into the light guide sheet via the groove of the light coupling structure.

5. The light guide apparatus as claimed in claim 4, wherein the groove is of a shape selected from the group consisting of a circular shape, triangle shape, polygon shape and irregular shape.

6. The light guide apparatus as claimed in claim 4, wherein the center of the light source is disposed at a geometrical center of a section of the groove.

7. The light guide apparatus as claimed in claim 1, wherein the light emerging structure comprises at least one micro structure for evenly distributing the light emitted by the light source.

8. The light guide apparatus as claimed in claim 7, wherein the micro structure is a structure selected from the group consisting of an rhombic structure, a circular dot structure and an irregular structure.

9. The light guide apparatus as claimed in claim 1, which is applicable to a backlight module.

10. The light guide apparatus as claimed in claim 1, further comprising a reflecting surface provided at a side of the light guide apparatus against the light source, in order to act as an illuminating device.

* * * * *